US011303439B2

(12) United States Patent
Choi et al.

(10) Patent No.: US 11,303,439 B2
(45) Date of Patent: Apr. 12, 2022

(54) METHOD OF AND DEVICE FOR PERFORMING AUTHENTICATION USING HARDWARE SECURITY MODULE IN ONEM2M ENVIRONMENT

(71) Applicant: Penta Security Systems Inc., Seoul (KR)

(72) Inventors: Sung Ok Choi, Seoul (KR); Young In Park, Yongin-si (KR); Sang Gyoo Sim, Seoul (KR); Duk Soo Kim, Seoul (KR); Seok Woo Lee, Seoul (KR)

(73) Assignee: Penta Security Systems Inc., Seoul (KR)

( * ) Notice: Subject to any disclaimer, the term of this patent is extended or adjusted under 35 U.S.C. 154(b) by 427 days.

(21) Appl. No.: 16/432,770

(22) Filed: Jun. 5, 2019

(65) Prior Publication Data

US 2020/0213107 A1   Jul. 2, 2020

(30) Foreign Application Priority Data

Dec. 26, 2018   (KR) .................. 10-2018-0169313

(51) Int. Cl.
*H04L 9/08* (2006.01)
*H04L 29/06* (2006.01)
*H04W 4/70* (2018.01)

(52) U.S. Cl.
CPC ........ *H04L 9/0877* (2013.01); *H04L 63/0435* (2013.01); *H04L 63/166* (2013.01); *H04W 4/70* (2018.02)

(58) Field of Classification Search
CPC . H04L 9/0877; H04L 63/0435; H04L 63/166; H04W 4/70
See application file for complete search history.

(56) References Cited

U.S. PATENT DOCUMENTS

| 9,258,117 B1* | 2/2016 | Roth .................... H04L 9/0861 |
| 10,932,128 B2* | 2/2021 | Gehrmann ........ H04W 12/0431 |
| 2009/0209232 A1* | 8/2009 | Cha .................... H04L 63/0428 |
| | | 455/411 |
| 2013/0003966 A1 | 1/2013 | Ihle et al. |

(Continued)

FOREIGN PATENT DOCUMENTS

| KR | 10-2005-0099106 A | 10/2005 |
| KR | 10-2016-0099256 A | 8/2016 |

OTHER PUBLICATIONS

OneM2M, "Technical Specification", oneM2M-TS-0003-Security_Solutions-v-2014-08, pp. 1-91, 2014.*

(Continued)

*Primary Examiner* — Hee K Song
(74) *Attorney, Agent, or Firm* — Goldilocks Zone IP Law (57) ABSTRACT

Provided are a method and device for performing authentication using a hardware security module (HSM) in a one machine-to-machine (oneM2M) environment. The method of performing authentication using an HSM in a oneM2M environment includes extracting a symmetric key stored in the HSM using a security application programming interface (API), generating a first value and a second value using the extracted symmetric key, and performing mutual authentication with an M2M enrolment function (MEF) server through transport layer security pre-shared key ciphersuites (TLS-PSK) using the first value and the second value.

12 Claims, 4 Drawing Sheets

(56) References Cited

U.S. PATENT DOCUMENTS

2017/0012778 A1\* 1/2017 Choyi ..................... H04L 9/14
2020/0195696 A1\* 6/2020 Seed .................... H04L 67/303

OTHER PUBLICATIONS

OneM2M Security Solutions, oneM2M-TS-0003-Security_Solutions-V-2014-08, Aug. 1, 2014, pp. 1-91.
Security Guideline for oneM2M, Dec. 1, 2016, pp. 1-38.

\* cited by examiner

METHOD OF AND DEVICE FOR PERFORMING AUTHENTICATION USING HARDWARE SECURITY MODULE IN ONEM2M ENVIRONMENT

CLAIM FOR PRIORITY

This application claims priority to Korean Patent Application No. 2018-0169313 filed on Dec. 26, 2018 in the Korean Intellectual Property Office (KIPO), the entire contents of which are hereby incorporated by reference.

BACKGROUND

1. Technical Field

Example embodiments of the present invention relate in general to a method and device for performing authentication using a hardware security module (HSM) in a one machine-to-machine (oneM2M) environment and more specifically to a method of generating, distributing, and keeping a symmetric key used in a mutual authentication process between an M2M device and an M2M enrolment function (MEF) server in an oneM2M environment and ensuring integrity of the symmetric key.

2. Related Art

OneM2M is a global partnership project for Korean Telecommunication Technology Association (TTA), European Telecommunication Standards Institute (ETSI), US Alliance for Telecommunications Industry Solutions (ATIS), China Communication Standard Association (CCSA), Japanese Association of Radio Industry and Business (ARIB), etc., which are local standards development organizations all over the world, to provide M2M communication, requirements for Internet of Things (IoT) technologies, architectures, application programming interface (API) specifications, security solutions, etc. in cooperation.

OneM2M defines a mutual authentication process for establishing a secured session on the assumption that a symmetric key has been provided between an MEF server and an individual M2M entity. In other words, since oneM2M does not clearly standardize distribution, generation, etc. of a symmetric key, respective manufacturers may use different methods of generating and distributing a symmetric key. In this case, the compatibility is degraded, and a symmetric key may be leaked.

Therefore, it is necessary to strengthen the security of an oneM2M environment and use M2M equipment in a standardized environment by providing an agent for generating a symmetric key, a means for securely distributing a symmetric key, a means for preventing leakage of a distributed symmetric key, a means for maintaining the integrity of a symmetric key, and the like.

SUMMARY

Accordingly, example embodiments of the present invention are provided to substantially obviate one or more problems due to limitations and disadvantages of the related art.

Example embodiments of the present invention provide a method of performing authentication using a hardware security module (HSM) in a one machine-to-machine (oneM2M) environment.

The method of performing authentication comprising extracting a symmetric key stored in the HSM using a security application programming interface (API); generating a first value and a second value using the extracted symmetric key; and performing mutual authentication with an M2M enrolment function (MEF) server through transport layer security pre-shared key ciphersuites (TLS-PSK) using the first value and the second value.

The method is performed by M2M equipment having the HSM therein.

The generating of the first value and the second value is performed after the security API determines whether to permit access to the HSM.

The determining of whether to permit access to the HSM comprises receiving a key identifier of the symmetric key; and verifying validity of the key identifier using the symmetric key.

The verifying of the validity of the key identifier comprises extracting a unique identifier of the HSM from the HSM; generating a verification value by combining the extracted unique identifier and the symmetric key and one-way encrypting the combined value; and determining whether the generated verification value coincides with the key identifier.

The first value is generated using 32 least significant bytes of the symmetric key.

The second value is generated using 16 most significant bytes of the symmetric key.

The first value functions as a pre-provisioned credential for Master Credential provisioning in the oneM2M environment.

The second value functions as a pre-provisioned credential for Master Credential provisioning identifier in the oneM2M environment.

Example embodiments of the present invention also provide a device for performing authentication using an HSM in an oneM2M environment.

The device for performing authentication comprising at least one processor; a memory configured to store instructions for instructing the at least one processor to perform at least one operation; and the HSM configured to store a symmetric key for mutual security authentication with an M2M enrolment function (MEF) server.

The at least one operation comprises extracting the symmetric key stored in the HSM using a security application programming interface (API); generating a first value and a second value using the extracted symmetric key; and performing mutual authentication with an MEF server through transport layer security pre-shared key ciphersuites (TLS-PSK) using the first value and the second value.

The device further comprising at least one of an application entity (AE) configured to be in an application layer and provide an application service in the oneM2M environment and a common service entity (CSE) configured to be in a common service layer and perform data management, device management, and M2M service subscription management in the oneM2M environment.

The generating of the first value and the second value is performed after the security API determines whether to permit access to the HSM.

The determining of whether to permit access to the HSM comprises receiving a key identifier of the symmetric key; and verifying validity of the key identifier using the symmetric key.

The verifying of the validity of the key identifier comprises extracting a unique identifier of the HSM from the HSM; generating a verification value by combining the extracted unique identifier and the symmetric key and one-way encrypting the combined value; and determining whether the generated verification value coincides with the key identifier.

The first value is generated using 32 least significant bytes of the symmetric key.

The second value is generated using 16 most significant bytes of the symmetric key.

The first value functions as a pre-provisioned credential for Master Credential provisioning in the oneM2M environment.

The second value functions as a pre-provisioned credential for Master Credential provisioning identifier in the oneM2M environment.

In some example embodiments, a method of performing authentication using an HSM in an oneM2M environment is provided.

In other example embodiments, a device for performing authentication using an HSM in an oneM2M environment is provided.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Example embodiments of the present invention are disclosed herein. However, specific structural and functional details disclosed herein are merely representative for purposes of describing example embodiments of the present invention, and example embodiments of the present invention may be embodied in many alternative forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Figure 1:
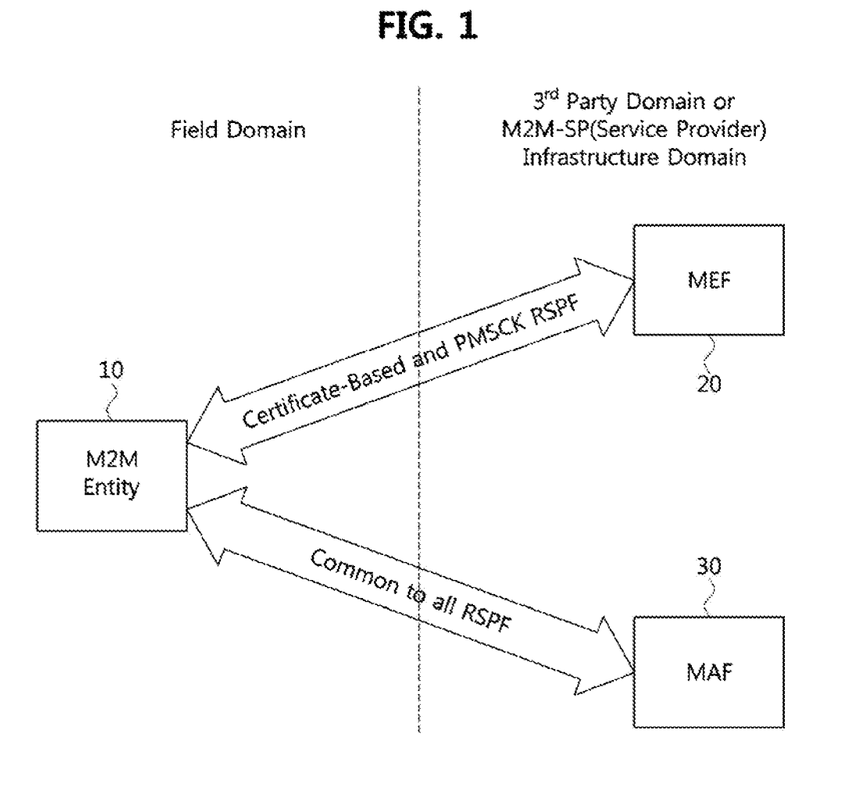
FIG. 1 is an example diagram illustrating authentication and registration procedures of a machine-to-machine (M2M) device in a one M2M (oneM2M) environment according to an example embodiment of the present invention.

FIG. 1 is an example diagram illustrating authentication and registration procedures of a machine-to-machine (M2M) device in a one M2M (oneM2M) environment according to an example embodiment of the present invention.

In FIG. 1, M2M entities 10 may collectively indicate agents (or servers) in charge of applications or common services in a field domain or an infrastructure domain of an M2M environment. For example, the M2M entities 10 may include an application entity (AE) and a common service entity (CSE). The AE may be an entity which is in an application layer in an oneM2M environment and in charge of an application service, and the CSE may be an entity which is in a common service layer in an oneM2M environment and performs data management, device management, M2M service subscription management, and the like.

In FIG. 1, an M2M authentication function (MAF) 30 may be an agent (or a server) which securely stores master credentials used to authenticate the M2M entities 10 registered into an M2M service and takes responsibility for all security operations including use of the master credentials.

In FIG. 1, an M2M enrolment function (MEF) 20 may be an agent (or a server) which supports a security bootstrap procedure. Here, the security bootstrap procedure may be a procedure enabling provisioning (or allocation) of master credentials. In other words, the MEF 20 may provide master credentials to the MAF 30 and the M2M entities 10.

The M2M entities 10 in the field domain require a provisioning process of allocating necessary resources or encryption keys and a configuration process of inputting various initial setting values before the M2M entities are installed in a field. These processes may be performed for pre-provisioning in a manufacturing or production process or performed as means for a security bootstrap procedure, e.g., remote security provisioning, before operation in the field.

A remote security provisioning procedure is performed according to remote security provisioning frameworks (RSPF). Here, RSPF may be a standard providing pre-provisioning of the essential security information to establish a security association between an M2M entity 10 in the field domain and the MAF 30 in the infrastructure domain of an M2M service provider.

The essential security information may include security credentials and identifiers. The RSPF-based remote security provisioning procedure may vary according to whether an MEF 20 which may be external to the M2M service provider has established appropriate credentials.

In other words, for mutual authentication between the M2M entity 10 and the MAF 30, it may be necessary to authenticate the MEF 20. In this case, the M2M entity 10 and the MEF 20 may perform mutual authentication using a symmetric key (a provisioned M2M secure connection key (PMSCK)) previously provisioned therebetween.

Therefore, it is necessary to provision the symmetric key to each of the M2M entity 10 and the MEF 20 in advance for mutual authentication therebetween. It will be described below who will generate the symmetric key, who will distribute the symmetric key, how to keep the symmetric key, and how to verify the integrity of the symmetric key.

Figure 2:
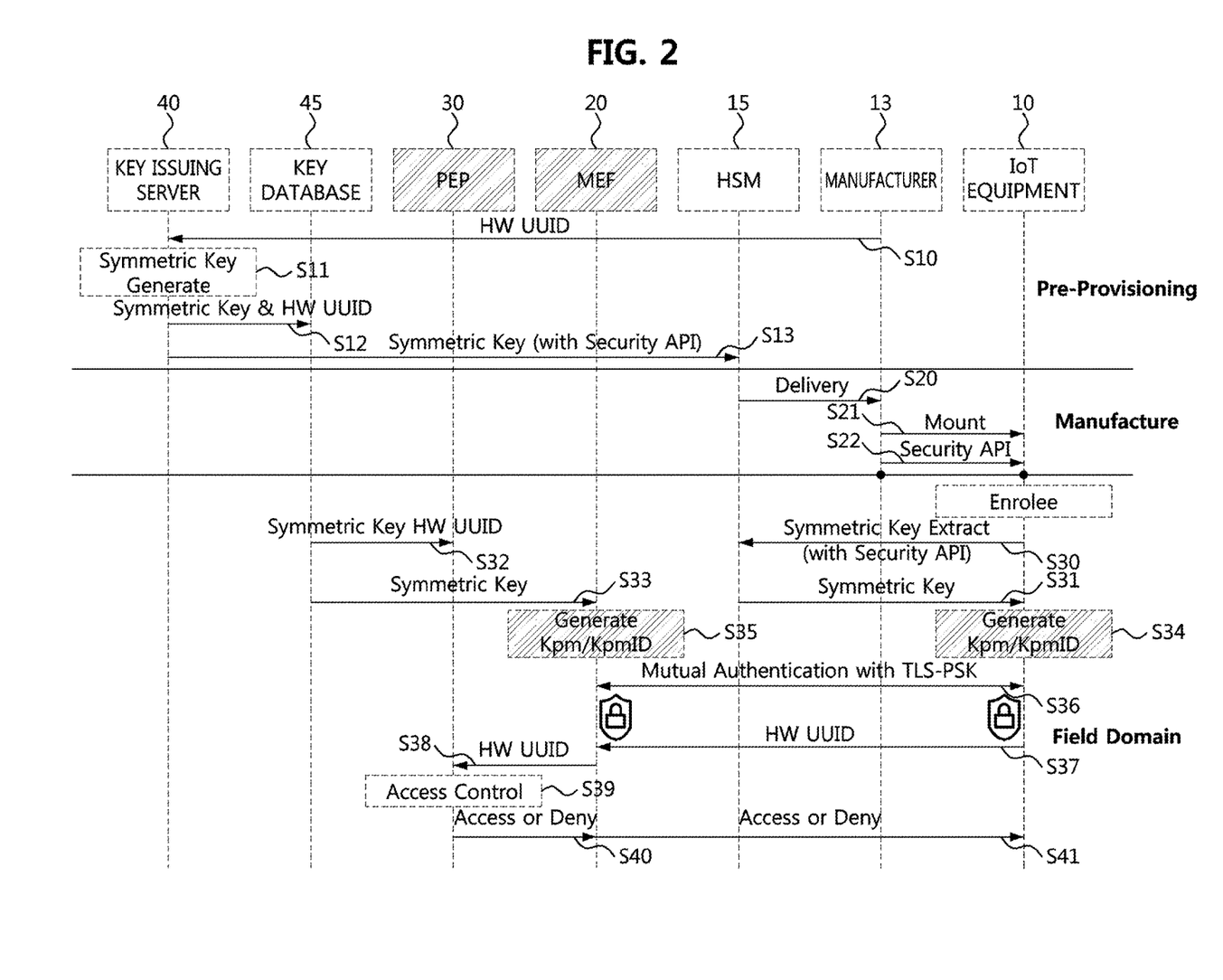
FIG. 2 is a sequence diagram illustrating overall operation of a method of performing authentication using a hardware security module (HSM) in an oneM2M environment according to an example embodiment of the present invention.

FIG. 2 is a sequence diagram illustrating overall operation of a method of performing authentication using a hardware security module (HSM) in an oneM2M environment according to an example embodiment of the present invention.

The method of performing authentication using an HSM in an oneM2M environment may include a pre-provisioning operation in which a symmetric key is generated and provisioned to an HSM, a manufacture operation in which a manufacturer installs the HSM in M2M equipment, and a field domain operation in which the M2M equipment is disposed in a field for operation and performs authentication with an MEF. A case in which the M2M equipment is Internet of Things (IoT) equipment is described as an example.

First, in the pre-provisioning operation, a manufacturer 13 (or an operation server run by the manufacturer) of IoT equipment 10 may transmit a unique identifier (e.g., a universally unique identifier (UUID)) of the IoT equipment 10 to a key issuing server 40 (S10).

The key issuing server 40 may generate a symmetric key using the received unique identifier (S11) and store the generated symmetric key and the unique identifier. At this time, the key issuing server 40 may store the symmetric key and the unique identifier in a key database 45 which is present outside the key issuing server 40 (S12).

The symmetric key generated by the key issuing server 40 may be stored in an HSM 15 (S13), and the symmetric key stored in the HSM 15 may be configured to be accessible through a security application programming interface (API) only.

In the manufacture operation, the manufacturer 13 may acquire the HSM 15 in which the symmetric key has been stored (S20), mount the HSM 15 in the IoT equipment 10 (S21), and install related data on the IoT equipment 10 (S22) so that the security API for accessing the symmetric key of the mounted HSM 15 may operate.

In the field domain operation, when the IoT equipment 10 is disposed in an M2M environment, the IoT equipment 10 may access the HSM 15 through the security API (S30) and acquire the symmetric key (S31). Meanwhile, before or after the operations S30 and S31, a policy enforcement point (PEP) 30 may acquire the symmetric key and the unique identifier from the key database 45 or the key issuing server 40 (S32), and an MEF 20 may also acquire the symmetric key from the key database 45 or the key issuing server 40 (S33). Here, the PEP 30 may be an agent (or a server) which interprets resource access requests, makes access control decision requests, and enforces access control decisions in an oneM2M environment.

Meanwhile, when the IoT equipment 10 acquires the symmetric key from the HSM 15 (S31), the IoT equipment 10 may generate a Kpm and a KpmID using the symmetric key (S34). Here, the Kpm may be a pre-provisioned credential for Master Credential provisioning described in FIG. 1, and the KpmID may be a pre-provisioned credential for Master Credential provisioning identifier.

Like the IoT equipment 10, the MEF 20 may generate the Kpm and the KpmID using the symmetric key (S35). When each of the IoT equipment 10 and the MEF 20 finishes generating the Kpm and the KpmID, the IoT equipment 10 and the MEF 20 may perform mutual authentication through transport layer security pre-shared key ciphersuites (TLS-PSK) using the generated Kpm and KpmID.

After the mutual authentication, the IoT equipment 10 may transmit the unique identifier to the MEF 20 (S37), and the MEF 20 may transmit the received unique identifier to the PEP 30 (S38). The PEP 30 may perform access control using the received unique identifier (S39) and notify the MEF 20 whether to permit access of the IoT equipment 10 corresponding to the unique identifier (S40). The MEF 20 may permit or deny access of the IoT equipment 10 with reference to the notification received from the PEP 30 (S41).

Figure 3:
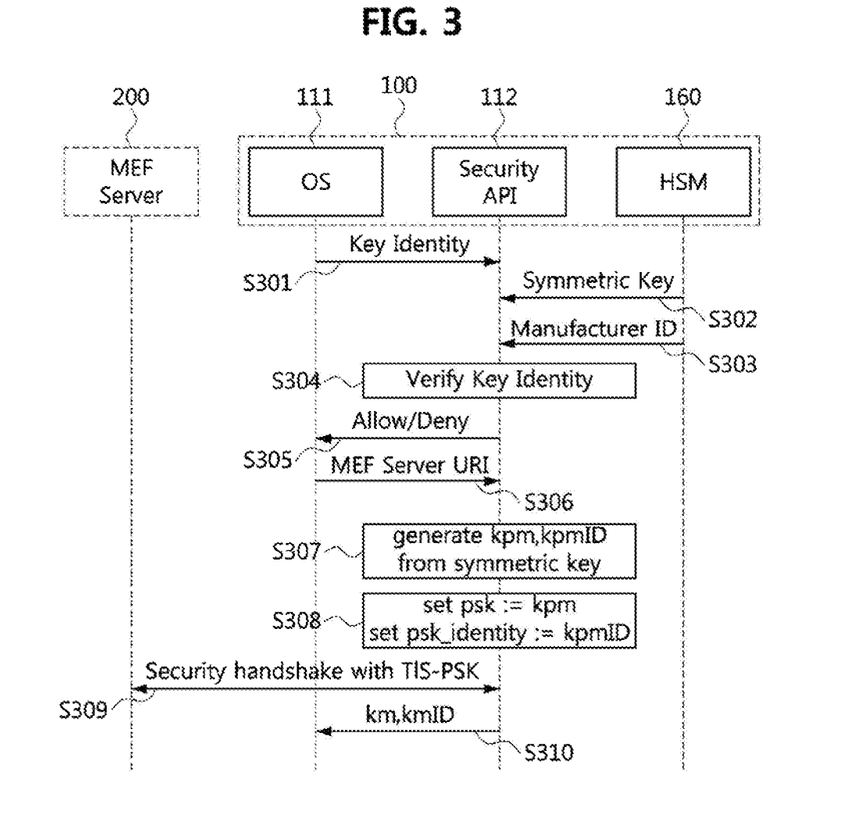
FIG. 3 is a sequence diagram illustrating operation in a field domain in detail regarding the method of performing authentication using an HSM in an oneM2M environment according to an example embodiment of the present invention.

FIG. 3 is a sequence diagram illustrating operation in a field domain in detail regarding the method of performing authentication using an HSM in an oneM2M environment according to an example embodiment of the present invention.

Referring to FIG. 3, it is possible to see detailed operation between an MEF server 200 operating as an MEF and M2M equipment (which may also be referred to as a device for performing authentication using an HSM in an oneM2M environment) 100 which has an HSM 160 therein and is set to access the HSM 160 through a security API 112.

First, an operating system (OS) 111 of the M2M equipment 100 may input a key identifier to the security API 112 (S301). When the key identifier is input, the security API 112 may extract a symmetric key from the HSM 160 (S302) and extract a unique identifier (a manufacturer ID) of the HSM 160 (S303).

Subsequently, the security API 112 may verify the key identifier using the extracted symmetric key and the unique identifier (S304). Specifically, the security API 112 may combine the symmetric key and the unique identifier, derive a verification value by one-way encrypting (or applying a hash function to) the combined value, and determine whether the derived verification value coincides with the key identifier. When the verification value coincides with the key identifier, the security API 112 may determine that the key identifier is valid and permit access to the security API 112 (S305). On the other hand, when the verification value does not coincide with the key identifier, the security API 112 may determine that the key identifier is invalid and deny access to the security API 112 (S305). In other words, since the key identifier is transferred to the security API 112 and used for the verification, it is possible to prevent the symmetric key stored in the HSM 160 from being leaked to a user. Here, the key identifier may be provided to a user of the M2M equipment 100 through a manufacturer of the HSM 160, and the user may input the key identifier using an input interface of the M2M equipment 100.

When the OS 111 of the M2M equipment 100 is permitted to access, the OS 111 may transfer a uniform resource identifier (URI) of the MEF server 200 to the security API 112 (S306). The security API 112 may generate a Kpm value and a KpmID value using the symmetric key extracted from the HSM 160 (S307). Specifically, the Kpm value may be generated with the 32 least significant bytes of the symmetric key, and the KpmID value may be generated with the 16 most significant bytes.

Subsequently, the security API 112 may attempt to access the MEF server 200 using the URI of the MEF server 200 and establish a security session by performing mutual authentication through TLS-PSK (S309). At this time, the security API 112 may use the previously generated Kpm and KpmID as symmetric key values used in the cryptographic protocols of TLS-PSK. More specifically, the Kpm may be set as a PSK parameter, and the KpmID may be set as a PSK identifier parameter (S308). Also, the MEF server 200 may generate and use the Kpm and the KpmID as a symmetric key used in the cryptographic protocols of TLS-PSK. Also, the security API 112 may transfer the Kpm and the KpmID generated in the operation S307 to the OS 111 (S310).

Meanwhile, operations of the security API 112 and the OS 111 are separately described in FIG. 3, but some operations may be implemented in combination or separately through an instruction executed by a processor.

Figure 4:
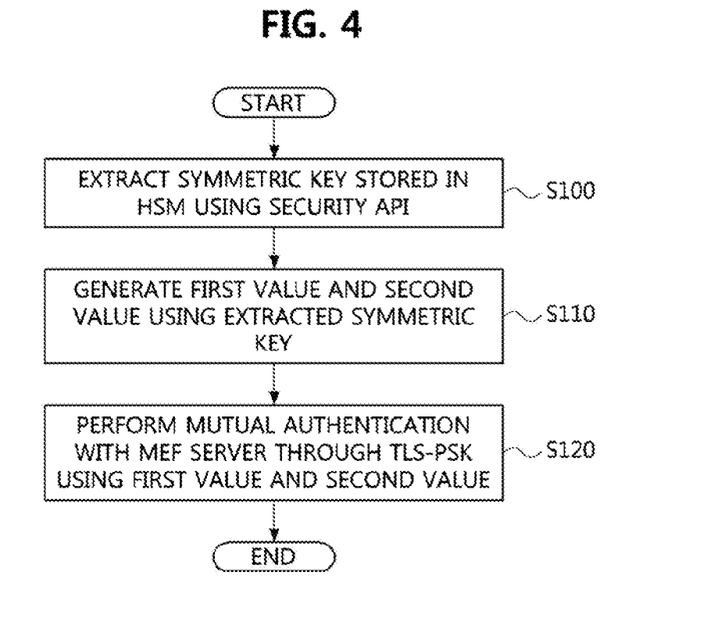
FIG. 4 is a flowchart of a method of performing authentication using an HSM in an oneM2M environment according to an example embodiment of the present invention.

FIG. 4 is a flowchart of a method of performing authentication using an HSM in an oneM2M environment according to an example embodiment of the present invention.

Referring to FIG. 4, the method of performing authentication using an HSM in an oneM2M environment may include an operation of extracting a symmetric key stored in the HSM using a security API (S100), an operation of generating a first value and a second value using the extracted symmetric key (S110), and an operation of performing mutual authentication with an MEF server through TLS-PSK using the first value and the second value (S120).

The method of performing authentication using an HSM may be performed by M2M equipment having the HSM therein.

The operation of generating the first value and the second value (S110) may be performed after an operation of determining whether to permit access to the HSM through the security API.

The operation of determining whether to permit access to the HSM may include an operation of receiving a key identifier of the symmetric key and an operation of verifying validity of the key identifier using the symmetric key.

The operation of verifying validity of the key identifier may include an operation of extracting a unique identifier of the HSM from the HSM, an operation of generating a verification value by combining the extracted unique identifier and the symmetric key and one-way encrypting the combined value, and an operation of determining whether the generated verification value coincides with the key identifier.

The first value may be generated using the 32 least significant bytes of the symmetric key. For example, the first value may be a Kpm value according to FIG. 3.

The second value may be generated using the 16 most significant bytes of the symmetric key. For example, the second value may be a KpmID value according to FIG. 3.

The first value may function as a pre-provisioned credential for Master Credential provisioning in an oneM2M environment.

The second value may function as a pre-provisioned credential for Master Credential provisioning identifier in an oneM2M environment.

Figure 5:
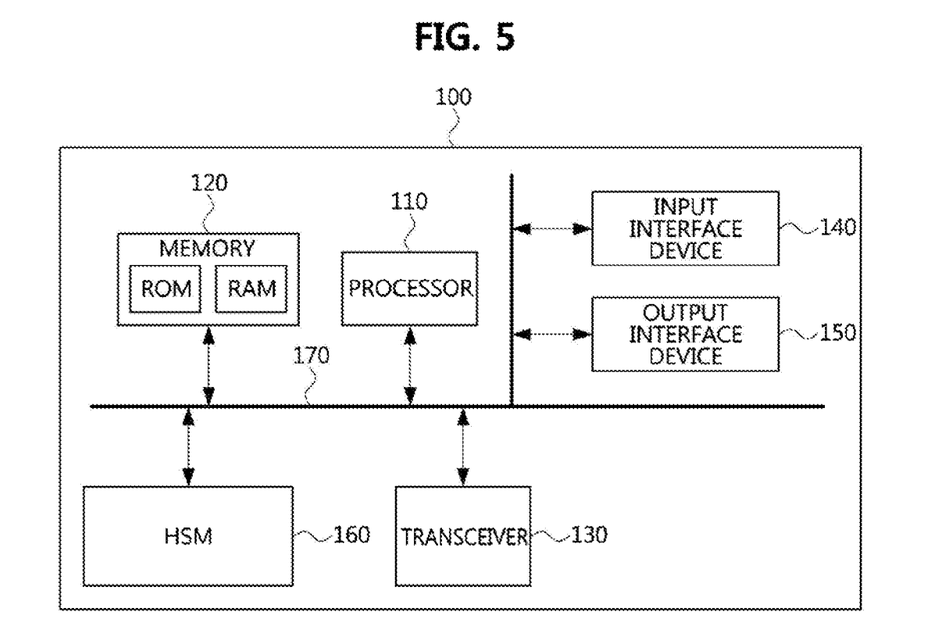
FIG. 5 is a block diagram of a device for performing authentication using an HSM in an oneM2M environment according to an example embodiment of the present invention.

FIG. 5 is a block diagram of a device for performing authentication using an HSM in an oneM2M environment according to an example embodiment of the present invention.

Referring to FIG. 5, a device 100 for performing authentication using an HSM in a oneM2M environment may include at least one processor 110, a memory 120 storing instructions for instructing the at least one processor 110 to perform at least one operation, and an HSM 160 storing a symmetric key for mutual authentication with an MEF server.

The at least one processor 110 may be a central processing unit (CPU), a graphics processing unit (GPU), or a dedicated processor whereby methods according to example embodiments of the present invention are performed. The memory 120 may be at least one of a volatile storage medium and a non-volatile storage medium. For example, the memory 120 may be at least one of a read-only memory (ROM) and a random access memory (RAM).

Also, the device 100 for performing authentication using an HSM in a oneM2M environment may include a transceiver 130 which performs communication via a wireless network. The device 100 for performing authentication using an HSM in a oneM2M environment may further include an input interface device 140 and an output interface device 150. The respective elements included in the device 100 for performing authentication using an HSM in a oneM2M environment may be connected through a bus 170 and communicate with each other.

The at least one operation may include an operation of extracting a symmetric key from the HSM 160 using a security API, an operation of generating a first value and a second value using the extracted symmetric key, and an operation of performing mutual authentication with an MEF server through TLS-PSK using the first value and the second value.

The device 100 may include at least one of an AE which is in the application layer in the oneM2M environment and provides an application service and a CSE which is in the common service layer in the oneM2M environment and performs data management, device management, and M2M service subscription management.

The operation of generating the first value and the second value may be performed after an operation of determining whether to permit access to the HSM 160 through the security API.

The operation of determining whether to permit access to the HSM 160 may include an operation of receiving a key identifier of the symmetric key and an operation of verifying validity of the key identifier using the symmetric key.

The operation of verifying validity of the key identifier may include an operation of extracting a unique identifier of the HSM 160 from the HSM 160, an operation of generating a verification value by combining the extracted unique identifier and the symmetric key and one-way encrypting the combined value, and an operation of determining whether the generated verification value coincides with the key identifier.

The first value may be generated using the 32 least significant bytes of the symmetric key.

The second value may be generated using the 16 most significant bytes of the symmetric key.

The first value may function as a pre-provisioned credential for Master Credential provisioning in the oneM2M environment.

The second value may function as a pre-provisioned credential for Master Credential provisioning identifier in the oneM2M environment.

Examples of the device 100 for performing authentication using an HSM in a oneM2M environment may be various IoT devices, such as a temperature sensor and a humidity sensor, and a desktop computer, a laptop computer, a smart phone, a tablet personal computer (PC), a mobile phone, a smart watch, smart glasses, an e-book reader, a portable multimedia player (PMP), a portable game machine, a navigation device, a digital camera, a digital multimedia broadcasting (DMB) player, a digital audio recorder, a digital audio player, a digital video recorder, a digital video player, a personal digital assistant (PDA), etc. capable of communication.

The above-described method and device for performing authentication using an HSM in an oneM2M environment according to example embodiments of the present invention make it possible to securely register an M2M node while ensuring the integrity of a symmetric key.

Also, it is possible to securely transfer a symmetric key to M2M equipment by installing an HSM in which a symmetric key is stored in the M2M equipment.

Also, it is possible to prevent leakage of a symmetric key stored in an HSM through a procedure for verifying access to the HSM, such that security is strengthened.

Also, since the method and device take oneM2M environments as targets, it is possible to ensure compatibility with a standard environment.

While the example embodiments of the present invention and their advantages have been described in detail, it should be understood that various changes, substitutions and alterations may be made herein without departing from the scope of the invention.

What is claimed is:

1. A method of performing authentication using a hardware security module (HSM) in a one machine-to-machine (oneM2M) environment, the method comprising:
   extracting a symmetric key stored in the HSM using a security application programming interface (API);
   generating a first value and a second value using the extracted symmetric key; and
   performing mutual authentication with an M2M enrolment function (MEF) server through transport layer security pre-shared key ciphersuites (TLS-PSK) using the first value and the second value,
   wherein the generating of the first value and the second value is performed after the security API determines whether to permit access to the HSM,
   wherein the determining of whether to permit access to the HSM comprises receiving a key identifier of the symmetric key; and verifying validity of the key identifier using the symmetric key;
   wherein the verifying of the validity of the key identifier comprises extracting a unique identifier of the HSM from the HSM; generating a verification value by combining the extracted unique identifier and the symmetric key and one-way encrypting the combined value; and determining whether the generated verification value coincides with the key identifier.

2. The method of claim 1, wherein the method is performed by M2M equipment having the HSM therein.

3. The method of claim 1, wherein the first value is generated using 32 least significant bytes of the symmetric key.

4. The method of claim 1, wherein the second value is generated using 16 most significant bytes of the symmetric key.

5. The method of claim 1, wherein the first value functions as a pre-provisioned credential for Master Credential provisioning in the oneM2M environment.

6. The method of claim 1, wherein the second value functions as a pre-provisioned credential for Master Credential provisioning identifier in the oneM2M environment.

7. A device for performing authentication using a hardware security module (HSM) in a one machine-to-machine (oneM2M) environment, the device comprising:
   at least one processor;
   a memory configured to store instructions for instructing the at least one processor to perform at least one operation; and
   the HSM configured to store a symmetric key for mutual security authentication with an M2M enrolment function (MEF) server,
   wherein the at least one operation comprises:
   extracting the symmetric key stored in the HSM using a security application programming interface (API);
   generating a first value and a second value using the extracted symmetric key; and
   performing mutual authentication with an MEF server through transport layer security pre-shared key ciphersuites (TLS-PSK) using the first value and the second value,
   wherein the generating of the first value and the second value is performed after the security API determines whether to permit access to the HSM,
   wherein the determining of whether to permit access to the HSM comprises receiving a key identifier of the symmetric key; and verifying validity of the key identifier using the symmetric key,
   wherein the verifying of the validity of the key identifier comprises extracting a unique identifier of the HSM from the HSM; generating a verification value by combining the extracted unique identifier and the symmetric key and one-way encrypting the combined value; and determining whether the generated verification value coincides with the key identifier.

8. The device of claim 7, further comprising at least one of an application entity (AE) configured to be in an application layer and provide an application service in the oneM2M environment and a common service entity (CSE)

configured to be in a common service layer and perform data management, device management, and M2M service subscription management in the oneM2M environment.

9. The device of claim 7, wherein the first value is generated using 32 least significant bytes of the symmetric key.

10. The device of claim 7, wherein the second value is generated using 16 most significant bytes of the symmetric key.

11. The device of claim 7, wherein the first value functions as a pre-provisioned credential for Master Credential provisioning in the oneM2M environment.

12. The device of claim 7, wherein the second value functions as a pre-provisioned credential for Master Credential provisioning identifier in the oneM2M environment.

* * * * *